United States Patent [19]
Hu et al.

[11] Patent Number: 5,361,134
[45] Date of Patent: Nov. 1, 1994

[54] INTEGRATED MULTIFUNCTIONAL DOCUMENT PROCESSING SYSTEM FOR FAXING, COPYING, PRINTING, AND SCANNING DOCUMENT INFORMATION

[75] Inventors: Darwin Hu, San Jose, Calif.; John J. Ring, Cherry Hill, N.J.

[73] Assignee: Oki America, Inc., Hackensack, N.J.

[21] Appl. No.: 72,364

[22] Filed: Jun. 3, 1993

Related U.S. Application Data

[63] Continuation of Ser. No. 857,215, Mar. 25, 1992, abandoned, Continuation-in-part of Ser. No. 746,831, Aug. 19, 1991, abandoned.

[51] Int. Cl.$^5$ .................... H04N 1/21; G03G 21/00
[52] U.S. Cl. .................... 358/296; 358/401; 358/442; 355/202
[58] Field of Search ............... 358/296, 401, 442, 443, 358/444, 468; 355/202, 204; 400/121

[56] References Cited

U.S. PATENT DOCUMENTS

| | | | |
|---|---|---|---|
| 4,268,157 | 5/1981 | Ebi et al. | 355/3 TR |
| 4,424,524 | 1/1984 | Daniele | 346/160 |
| 4,652,933 | 3/1987 | Koshiishi | 358/256 |
| 4,754,300 | 6/1988 | Fukae | 355/3 R |
| 4,794,419 | 12/1988 | Shibazaki et al. | 355/3 R |
| 4,814,798 | 3/1989 | Fukae et al. | 346/160 |
| 4,821,107 | 4/1989 | Naito et al. | 358/256 |
| 4,860,115 | 8/1989 | Ogura | 358/443 |
| 4,876,609 | 10/1989 | Ogura | 358/443 |
| 4,905,098 | 2/1990 | Sakata | 358/468 |
| 4,910,607 | 3/1990 | Kita et al. | 358/400 |
| 4,914,525 | 4/1990 | Abe et al. | 358/498 |
| 4,947,345 | 8/1990 | Paradise et al. | 364/519 |
| 4,959,731 | 9/1990 | Fukae | 358/300 |
| 4,964,154 | 10/1990 | Shimotono | 358/442 X |
| 4,992,884 | 2/1991 | Sakata | 358/401 |
| 5,021,892 | 6/1991 | Kita et al. | 358/468 |
| 5,200,993 | 4/1993 | Wheeler et al. | 358/442 X |
| 5,216,461 | 6/1993 | Maekawa et al. | 355/202 |

FOREIGN PATENT DOCUMENTS

| | | |
|---|---|---|
| 0048118 | 3/1982 | European Pat. Off. . |
| 0262603 | 4/1988 | European Pat. Off. ........ H04N 1/32 |
| 0426412 | 5/1991 | European Pat. Off. . |
| 57-8561 | 1/1982 | Japan . |
| 59-12668 | 1/1984 | Japan . |
| 60-51065 | 3/1985 | Japan . |
| 2217261 | 10/1989 | United Kingdom .......... H04N 1/00 |

*Primary Examiner*—Benjamin R. Fuller
*Assistant Examiner*—Eric Frahm
*Attorney, Agent, or Firm*—Panitch Schwarze Jacobs & Nadel

[57] ABSTRACT

A multifunctional document processing system for faxing, copying, printing or scanning document information and for transmitting and receiving document signals to and from a remote device. The system comprises a multifunctional local device which includes a scanner for optically scanning document information, for converting the scanned document information into electrical document signals and for transmitting the document signals to the processor. The multifunctional local device also includes a recording device, such as a printer for receiving document signals from the processor and for producing a recorded form of the document information, such as a printed document based on the received document signals. A control module is interfaced between the processor and the multifunctional local device for receiving document signals from the multifunctional local device and from the remote device and for sending the received documents signals to the processor. The control module also receives document signals from the processor and sends the received document signals to either the multifunctional local device or the remote device. The control module additionally generates and transmits control signals to the multifunctional local device.

10 Claims, 5 Drawing Sheets

INTEGRATED MULTIFUNCTIONAL DOCUMENT PROCESSING SYSTEM FOR FAXING, COPYING, PRINTING, AND SCANNING DOCUMENT INFORMATION

This is a continuation of application Ser. No. 07/857,215, filed Mar. 25, 1992 abandoned, which is a continuation-in-part of co-pending application Ser. No. 07/746,831, filed Aug. 19, 1991 abandoned.

BACKGROUND OF THE INVENTION

The present invention relates to an integrated multifunctional document processing system and, more particularly, to a multifunctional document processing system which may be used for processing, scanning, faxing, printing and copying document information.

Most modern offices have separate machines for scanning documents, sending and receiving faxes, printing documents and copying documents. Each such separate machine is restricted to its own particular function and occupies a predetermined amount of office space. If a printed document is to be faxed to a remote location and additional copies of the document are to be made, a facsimile machine must be used to fax a copy of the document to the remote location and a separate copier must be used to make additional copies of the document. The use of two separate machines to accomplish relatively similar functions can be time consuming, particularly if each machine is located in a different part of the office. In addition, two machines can be expensive to acquire and maintain and often require twice as much office space as a single machine which could perform both functions.

In addition, many offices use word processors or personal computers (hereinafter collectively referred to as a personal computer) to create and edit documents. A separate printer, such as a laser printer, LED printer, etc., is usually associated with the personal computer so that printed copies of documents may be obtained from the personal computer. A copy of each of the documents is normally stored within a hard disk or other long term storage device of the personal computer or on a separate floppy disk so that the document can be retrieved at a later point in time if additional copies of the document are needed or to permit editing of the document. If the document is to be edited or revised, the document is retrieved from the memory of the personal computer and the changes are made. A printed copy of the revised version of the document can then be obtained by entering the appropriate instructions into the personal computer for activating the printer to print a copy of the document.

Most other office machines, such as fax machines, copiers and optical scanners are incapable of independently creating or revising a document. Such machines are only capable of accepting documents which are in final form and, in the case of a fax machine, normally must be printed on a type of paper suitable for faxing. For example, if a revised form of a document is to be faxed to a remote location and, prior to faxing, the document must be retrieved from the memory of the personal computer, revised, and reprinted by the printer onto paper before it is ready be supplied to the fax machine to be faxed. This multi-step, multi-machine operation can be a time consuming process which can ultimately lower the efficiency of an office.

There is a strong need for a single apparatus or device which is capable of creating and editing document information and which also inherently includes the capability of scanning, faxing, printing and copying a document. There is also a need for a system which can ensure confidentiality of documents such that access to the documents is limited to an identified person or a group of identified persons. The apparatus or device should preferably be compact so that the device can be maintained on a desk top and the device must be capable of producing high quality printed copies acceptable for business purposes.

The present invention is directed to an integrated multifunctional document processing system (MDPS) which is capable of scanning, faxing, copying or printing a document. Document information is converted into electrical document signals and is transmitted by a remote device to the MDPS. Alternatively, document information is directly inputted into the MDPS and converted into electrical documents signals. Processing means within the MDPS processes the document signals and transmits the document signals to the remote device or outputs the document signals directly via a multifunctional local paper processing device. The local paper processing device or remote device then performs the desired function, i.e., either scanning, faxing, printing or copying the requested document. The local paper processing device is contained with the MDPS and directly interfaced with the processing means. The remote device is external to the MDPS and interfaced with the processing means of the MDPS. Control means communicates to and from the local paper processing device or remote device and the processing means.

The MDPS of the present invention is user friendly and can be employed for accomplishing a variety of tasks. For example, if a user wanted to prepare a resume and incorporate a photograph, the text portion of the resume can be prepared utilizing the word processing features of the processing means and the photograph can be scanned into the MDPS utilizing a scanner associated with the MDPS. The processing means can then integrate the photograph with the text and the resulting resume can be printed by the local paper processing device of the MDPS. In addition, a previously printed document which is not stored in the MDPS can be updated or changed by scanning the document directly into the processing means using the scanner. The changes can then be made to the paper utilizing the word processing features of the processing means and the revised document can be printed out by the local paper processing device of the MDPS.

The system also permits a single document stored within the memory of the processing means to be sequentially faxed to multiple fax machines at multiple remote locations utilizing fax software within the processing means. Incoming faxes which are received by the system are stored in the memory of the processing means for later printout. The system provides for identified fax documents to be stored in specifically identified memory locations (i.e., mailboxes) within the processing means for later retrieval and/or printout only by a particular person to whom the fax is addressed under the control of a particular security code or password. The system also permits the addressee of a fax to retrieve the fax from a remote location utilizing another fax machine or another multifunctional document processing system. It is clear that the system of the present invention is more versatile and is able to perform additional tasks or functions which could not be readily performed utilizing a separate printer, scanner and/or fax machine as is done with the prior art.

SUMMARY OF THE INVENTION

Briefly stated, the present invention is directed to an integrated multifunctional document processing system for faxing, copying, printing or scanning document information and for transmitting and receiving document signals to and from a remote device. The document processing system comprises a housing which includes scanning means for optically scanning document information, document information converting means for converting the scanned document information into electrical document signals; and processing means for processing the electrical document signals. A multifunctional local device is located within the housing and includes recording means for receiving document signals from the processing means and for producing a recorded form of the document information based on the received document signals. Control means located between the processing means and the multifunctional local device receives the document signals from the multifunctional local device. The control means also receives document signals from the remote device over a communication medium. The control means sends the received document signals to the processing means. The control means also receives document signals from the processing means and sends the received document signals to either the multifunctional local device or the remote device over the communication medium. The control means further functions to generate and transmit control signals to the multifunctional local device.

BRIEF DESCRIPTION OF THE DRAWING

The foregoing summary, as well as the following detailed description of a preferred embodiment, will be better understood when read in conjunction with the appended drawings. For the purpose of illustrating the invention, there is shown in the drawings an embodiment which is presently preferred, it being understood, however, that the invention is not limited to the specific methods and instrumentalities disclosed. In the drawings.

DESCRIPTION OF THE PREFERRED EMBODIMENT

Figure 1:
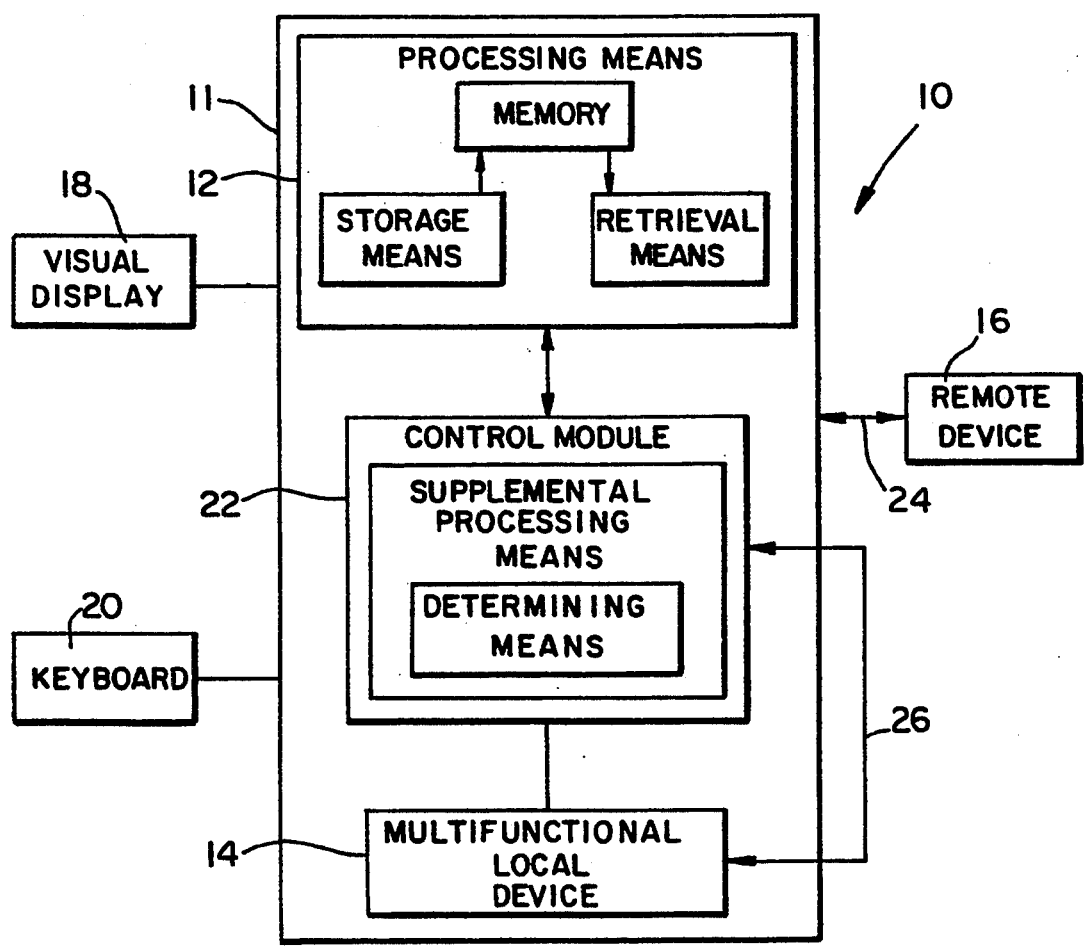
FIG. 1 is a schematic block diagram of a preferred embodiment of an integrated document processing system in accordance with the present invention.
Figure 2:
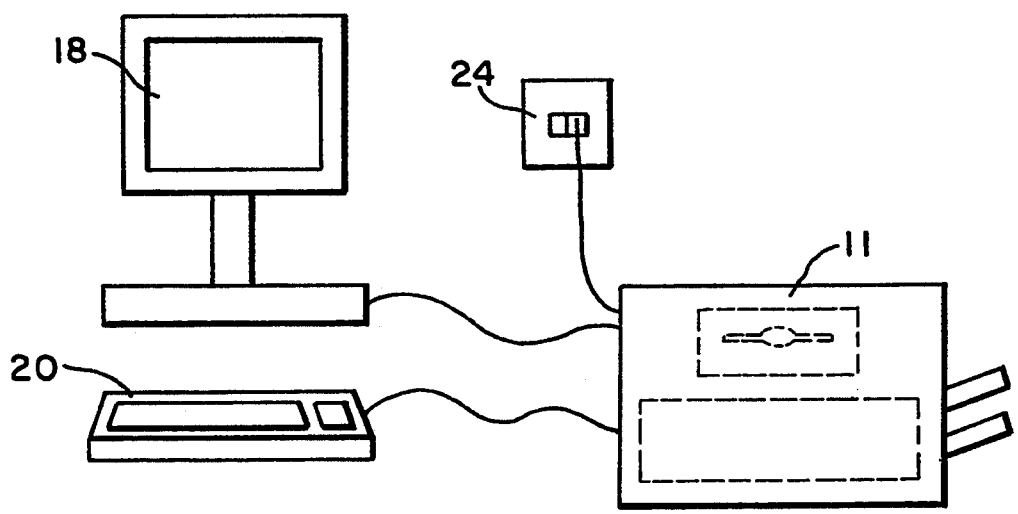
FIG. 2 is an elevational view of the integrated document processing system of FIG. 1.

Referring to the drawings wherein like numerals indicate like elements throughout, there is shown in FIGS. 1 and 2, an embodiment of an integrated multifunctional document processing system (MDPS) 10 in accordance with the present invention. The MDPS 10 comprises a housing 11 which forms a single stand alone unit containing the necessary logic and circuitry for scanning, printing, copying or faxing a document. The MDPS 10 comprises processing means 12 which receives document signals from a multifunctional local paper processing device or multifunctional local device 14, preferably located within the MDPS housing 11 or a remote device 16, for processing of the document signals within the multifunctional local device 14 or transmitting the document signals to the remote device 16. The processing means 12 which is illustrated in FIG. 2 is preferably a personal computer, such as, but not limited to, an IBM or an IBM compatible computer, or any other type of processor which is adapted to be integrated into the housing 11 of the MDPS 10. It is to be understood by those skilled in the art that any other brand or type of computer system, word processing system, whether networked or stand alone, or any other type of related device could be used in conjunction with the MDPS 10 without departing from the spirit and scope of the present invention. The terms processing means, personal computer and host computer are used herein only for the sake of brevity and should not be considered a limitation on the present invention.

The processing means 12 as illustrated includes a hard disk (not shown) as well as a main memory (not shown) which together act as the main storage data facility or memory of the processing means 12 in the usual manner well-known in the art.

Document signals received from the multifunctional local device 14 and the remote device 16 are stored within the memory of the processing means 12 until the signals are retrieved and processed. Auxiliary storage devices, such as floppy discs or the like can also be used to store the document signals received from the multifunctional local device 14 or the remote device 16 for later processing of the document signals.

The processing means 12 is preferably connected to a visual display device 18, such as a CRT, for displaying a document on-line. A user of the MDPS 10 can retrieve document signals from the memory of the processing means 12 and can display the document on the visual display device 18 for editing or otherwise changing the document. In addition, a keyboard 20 is associated with the processing means 12 for creating and revising documents which can be stored within the memory. The keyboard 20 may also be used for inputting instruction commands to the multifunctional local device 14. It is to be understood by those skilled in the art that any form of editing or creating device can be also used in conjunction with the processing means 12, such as, but not limited to, a touch screen, a laser pen, a mouse or the like.

The processing means 12 is interfaced with a control means, which is preferably a control module 22 located within the housing 11 of the MDPS 10, which passes document signals between the processing means 12 and the multifunctional local device 14 or the remote device 16. The control module 22 is preferably a self-contained plug-in printed circuit board or card which can be conveniently inserted within an available port (not shown) within the processing means 12. The control module 22 is an intelligent controller which controls all communication, printer emulation, printer, scanner and fax functions within the MDPS 10. The control module 22 can further include a supplementary processor (not shown) which is preferably a 32 bit processor, such as an Intel 80960 processor. The supplementary processor can also be a 16-bit or a 64-bit processor. The supplementary processor receives document signals from the processing means 12 or from the multifunctional local device 14 and determines the function which is to be performed with respect to the received document signals, i.e., print, fax, etc., and the destination of the document signals, i.e., to the multifunctional local device 14, to the remote device 16 or to the processing means 12. The functions which can be performed with respect to the document signals are scanning a document, faxing a document to a remote location, receiving a document faxed from a remote location, copying a document, and printing a document.

The control module 22 further includes a facsimile modem (not shown) for transmitting or receiving facsimiles to or from a remote location via the remote device 16 which in the present embodiment is a remotely located fax machine. The facsimile modem operates in the usual well-known manner to transmit documents over a communicating medium 24, such as the public switched telephone network and comprises 16 8-bit control registers. If the document signals received by the control module supplementary processor are to be faxed to the remote device 16 or have been received from the remote device 16, the supplementary processor accesses the facsimile modem for proper transmission or reception of the document signals. The supplementary processor accesses the control registers of the facsimile modem through an 8-bit parallel port (not shown). The parallel port transfers transmitting document signals and receiving document signals in an 8-bit data format.

As discussed above, the control module 22 controls all print, scan and fax functions. When the control module 22 receives document signals from the processing means 12, the control module 22 first identifies what function is to be performed and at what destination. In the preferred embodiment, the document signals received by the control module 22 are coded so that the control module 22 can easily identify the function which is to be performed. The code is preferably one that is easily recognized by the control module supplementary processor. For example, if the control module 22 is to transmit document signals to the remote device 16, such as through a facsimile transmission, the document signals received from the processing means 12 are transferred within the control module 22 to the facsimile modem (not shown) which converts the document signals into the appropriate format and then transmits the document signals over a communication medium 24 to the remote device 16. In the preferred embodiment, the communication medium 24 is a telephone link. It is to be understood by those skilled in the art that any suitable communication medium or transmission device can be used such as, but not limited to a modem or a UART. The remote device 16 can be a conventional facsimile or a multifunctional machine, such as, but not limited to a combination copier and facsimile, a combination facsimile and personal computer, or a device capable of scanning, faxing, copying or printing a document.

When a local function is to be performed such as printing or copying a document, the document signals are transmitted from the processing means 12 to the control module 22, which transfers the document signals to the multifunctional local device 14 contained within the housing of the MDPS 10. The multifunctional local device 14 in the preferred embodiment is employed for processing paper and preferably includes scanning means, such as a standard optical scanner for optically scanning document information and converting the scanned document information into electrical document signals. The multifunctional local device 14 also includes a recording or printing means, such as a standard printer for receiving document signals from the processing means 12 and for producing a recorded form of the document information, for example, a printed document based on the received document signals. In the presently preferred embodiment, the optical scanner is a removable hand held scanner and the printer is a standard LED printer, such as an OL800 printer which is commercially available from Okidata, Inc. It should be recognized that any other type of scanner and/or recording device, such as a film recorder, screen or other such device could alternatively be employed.

An interface 26 is located between the control module 22 and the multifunctional local device 14 for transmitting information in the form of electrical document signals and control signals between the control module 22 and the multifunctional local device 14, such as instructions for performing a particular function or status information. In the preferred embodiment, the interface 26 is a high speed serial video interface but some other appropriate interface, such as a small computer system interface (SCSI) could be employed.

Three types of document signals are communicated over the interface 26 from the control module 22 to the multifunctional local device 14. The first type of signals transmitted to the multifunctional local device 14 instruct the multifunctional local device 14 to print a particular document based upon particular document signals received from the processing means 12. The second type of signals transmitted to the multifunctional local device 14 instructs the multifunctional local device 14 to scan a particular document utilizing the scanner and to transmit the document signals from the scanner to the processing means 12. The third type of document signals transmitted to the multifunctional local device 14 act as a command or response communication to the multifunctional local device 14 and include printer, scanner and data flow control signals. All commands and responses are transferred between the multifunctional local device 14 and the control module 22 along the same physical connection via the interface 26.

Figure 3:
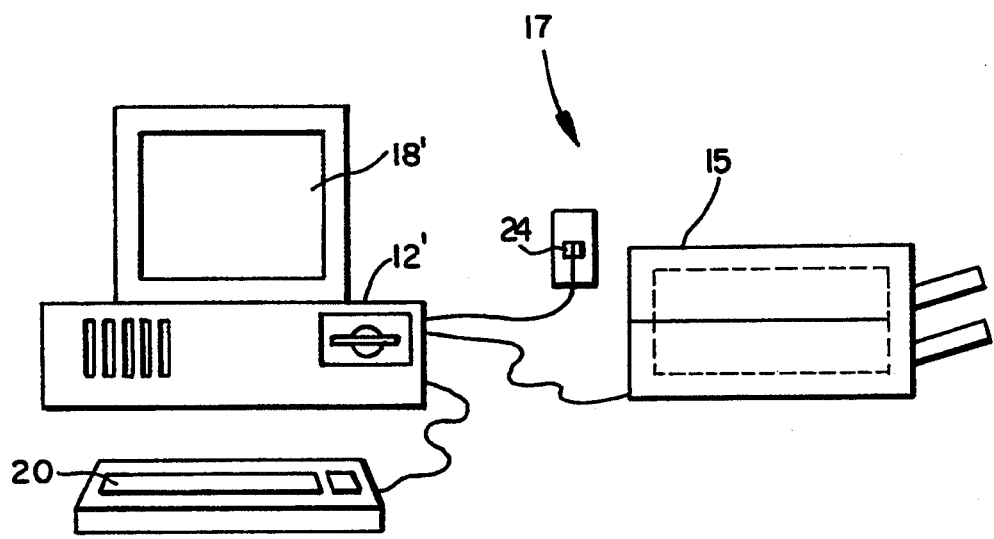
FIG. 3 is an alternate embodiment of the document processing system of FIG. 1.

Referring specifically to FIG. 3, there is shown an alternate embodiment of a document processing system 17 in accordance with the present invention. In the alternate embodiment, the processing means 12' is preferably an independent or stand alone personal computer which is attached to a separate stand alone multifunctional local peripheral device 15 by a control module (not shown) located within the personal computer. The control module is also connected to a remote device by a communication medium 24 which is preferably a standard telephone line. The document processing system 17 operates in a manner similar to that of the MDPS 10 and therefore, the detail of its operation will not be described further.

Figure 4:
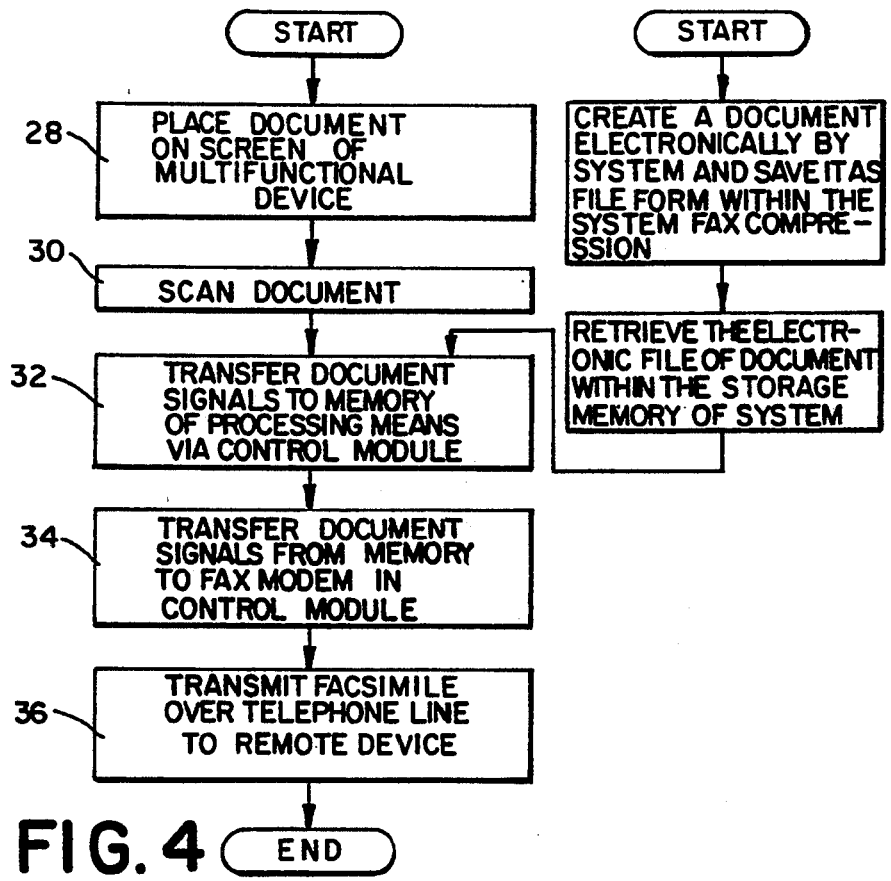
FIG. 4 is a flow chart depicting the facsimile transmission function of the document processing system of FIG. 1.

Referring to FIGS. 4-8, there are shown functional flow diagrams depicting a preferred manner for performing the various document processing functions in accordance with the above-described embodiment of the document processing system 10. Referring specifically to FIG. 4, there is shown a flow diagram depicting the preferred method by which the MDPS 10 functions to send or transmit a fax of a previously printed document to a remote location, such as to the remote device 16. The faxing function begins by placing a previously printed document to be faxed on the scanner (not shown) of the multifunctional local device 14 as depicted in block 28 or by passing the scanner over the document. The document is scanned and the information from the document is converted by the scanner and associated components into electrical document signals in block 30. In the preferred embodiment, the electrical document signals are initially digitized by the scanner and then converted into electrical signals. The document signals are then transferred to the memory of the processing means 12 utilizing the control module 22 as illustrated in block 32. The processing means 12 determines when the document signals are to be processed and may also maintain a stored copy of the document signals in the memory until a user of the MDPS 10 chooses to delete the document signals. The document signals are also transferred from the memory of the processing means 12 back to the control module 22 as illustrated in block 34. The control module 22 first determines that a facsimile transmission is to be performed and the document signals are transferred to the facsimile modem which is located within the control module 22. The document signals are then transmitted by the control module facsimile modem to the remote device 16 over the communication medium 24 as depicted in block 36. A printed copy of the facsimile transmission is produced at the remote device 16 in the manner well-known in the art depending upon the type of remote device 16 being employed.

Figure 5:
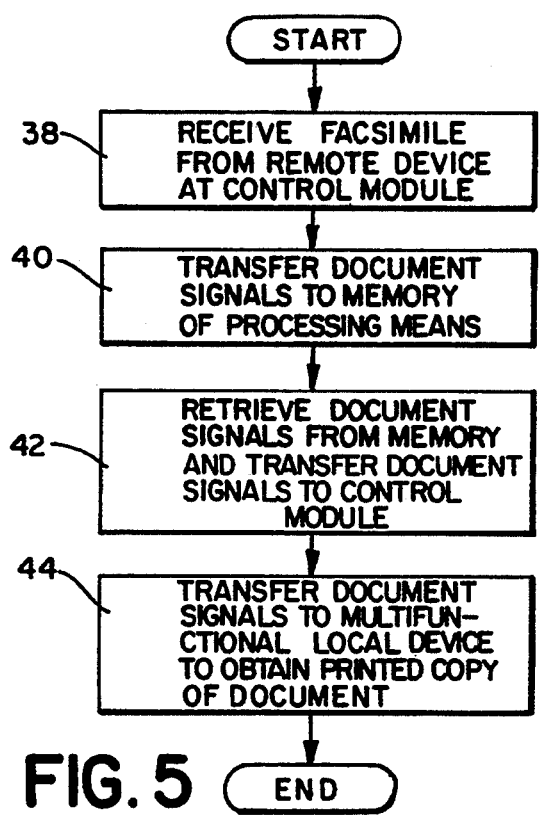
FIG. 5 is a flow chart depicting the facsimile reception function of the document processing system of FIG. 1.

Referring specifically to FIG. 5, there is shown a flow diagram depicting the preferred method by which a facsimile is received by the MDPS 10. A facsimile transmitted from the remote device 16 is transmitted as document signals over the communication medium 24 to the control module 22 as shown in block 38. The control module 22 determines whether the received document signals are to be transmitted to the processing means 12 or the multifunctional local device 14. Once the control module 22 detects that the document signals are an incoming facsimile received from the remote device 16, the received document signals are transferred to the memory of the processing means 12 as illustrated in block 40. If the multifunctional local device 14 is otherwise occupied when a printed copy of the facsimile is to be obtained, the received facsimile document signals can be stored in the memory of the processing means and retrieved by the user to be viewed on the visual display 18 associated with the processing means 12. A user can also request that a printed copy of the received facsimile be made if the multifunctional local device 14 is available. The received facsimile document signals are retrieved from the memory of the processing means 12 and are transferred to the control module 22 as shown in block 42. Once the control module 22 determines that the document signals are to be printed the control module 22 transfers the document signals to the multifunctional local device 14 to obtain a printed copy of the document as shown in block 44. In the preferred embodiment, the received facsimile is printed on plain paper. An indicator (not shown) may be associated with the multifunctional local device 14 to indicate to a user that a facsimile has been received. The indicator could either be a visual indicator, such as an LED or other lighted indicator or an audible indicator, such as an audible alarm signal.

Figure 6:
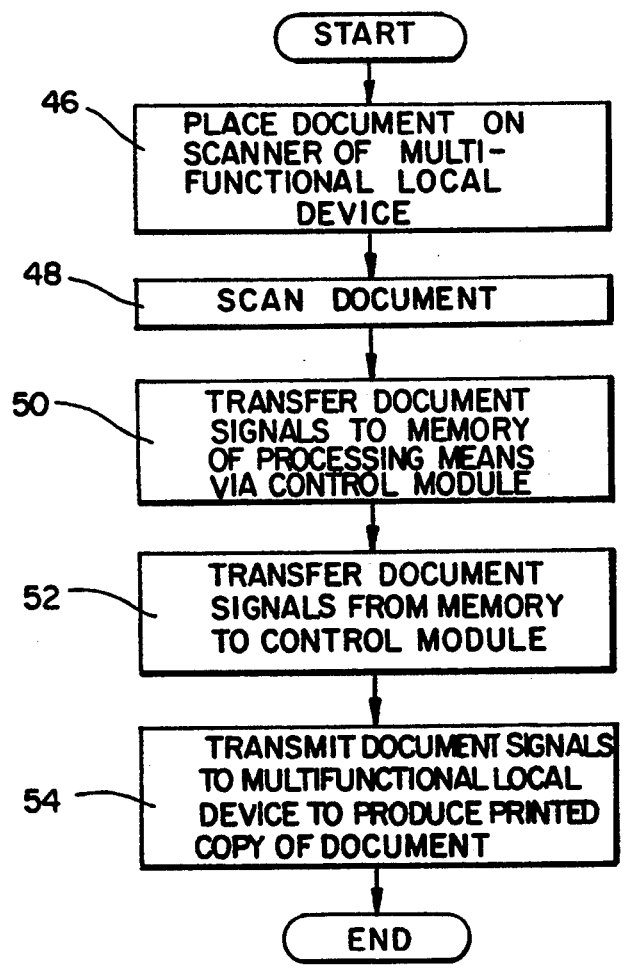
FIG. 6 is a flow chart depicting the copying function of the document processing system of FIG. 1.

Referring specifically to FIG. 6, there is shown a flow diagram depicting a preferred method of performing the copying function of the MDPS 10. A previously printed document to be copied is first placed on the scanner of the multifunctional local device 14 or the scanner is passed over the document as illustrated in block 46. The document is scanned and the information from the document is converted by the scanner and associated components into electrical document signals as shown in block 48. The document signals from the scanner are transferred from the multifunctional local device 14 to the memory of the processing means 12 via the control module 22 as illustrated in block 50. The document signals are then processed and are transferred from the memory of the processing means 12 back to the control module 22 as illustrated in block 52. Once the control module 22 has determined that a copying function is to be performed, the document signals are transferred from the control module 22 to the multifunctional local device 14 to produce a printed copy of the document as shown in block 54. If multiple copies of the document are to be made or the copies are to be made on a particular sized paper, the document signals are coded to indicate the particular instructions to the multifunctional local device 14 to obtain the desired number or sized copies.

Figure 7:
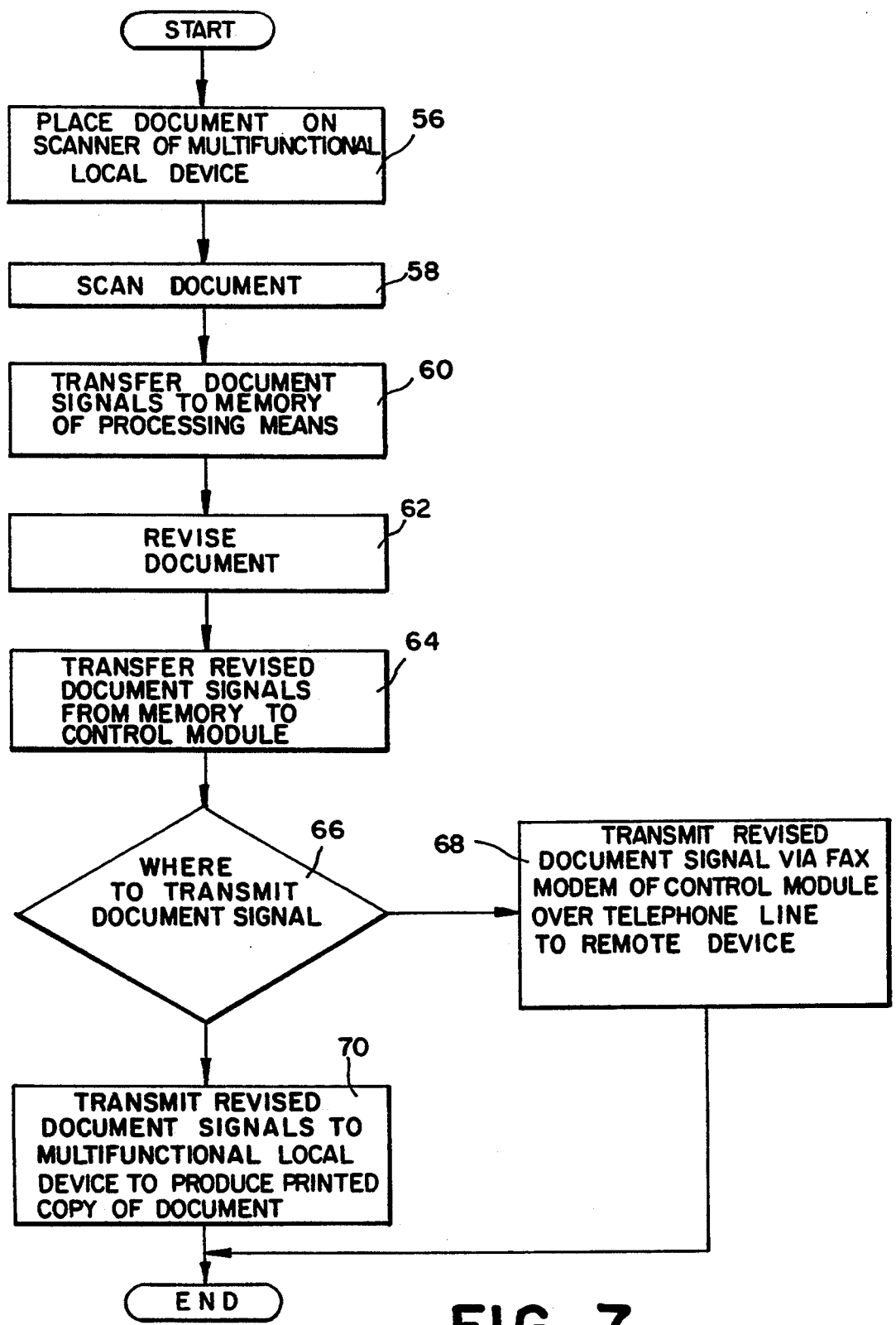
FIG. 7 is a flow chart depicting the scanning and editing functions of the document processing system of FIG. 1.

Referring specifically to FIG. 7, there is shown a flow diagram depicting the preferred method of performing the editing function of the MDPS 10. A previously printed document is placed on the scanner of the multifunctional local device 14 as shown in block 56. The document is scanned and the information from the document is converted by the scanner into electrical document signals as shown in block 58. The document signals are transferred from the multifunctional local device 14 to the memory of the processing means 12 via the control module 22 as illustrated in block 60. If the document is to be edited or revised, the document is retrieved from the memory of the processing means 12 and viewed on the visual display 18 associated with the processing means 12 for editing using the keyboard 20. Once the desired changes have been made to the document, using the keyboard 20, the edited document may be stored in the memory of the processing means 12 for later use. The document may also be faxed to a remote location or printed. The document signals are transferred to the control module 22 as shown in block 64. The control module 22 determines in block 66 whether the document signals are to be faxed to the remote device 16 or sent to the multifunctional local device for printing 14. If the document signals are to be faxed to the remote device 16, the control module 22 transfers the document signals to the facsimile modem which transmits the document signals over the communication medium 24 to the remote device 16 as shown in block 68. If the document signals are to be transferred to the multifunctional local device 14 for printing, the control module 22 transmits the document signals to the multifunctional local device 14 to produce a printed copy of the document as shown in block 70.

Figure 8:
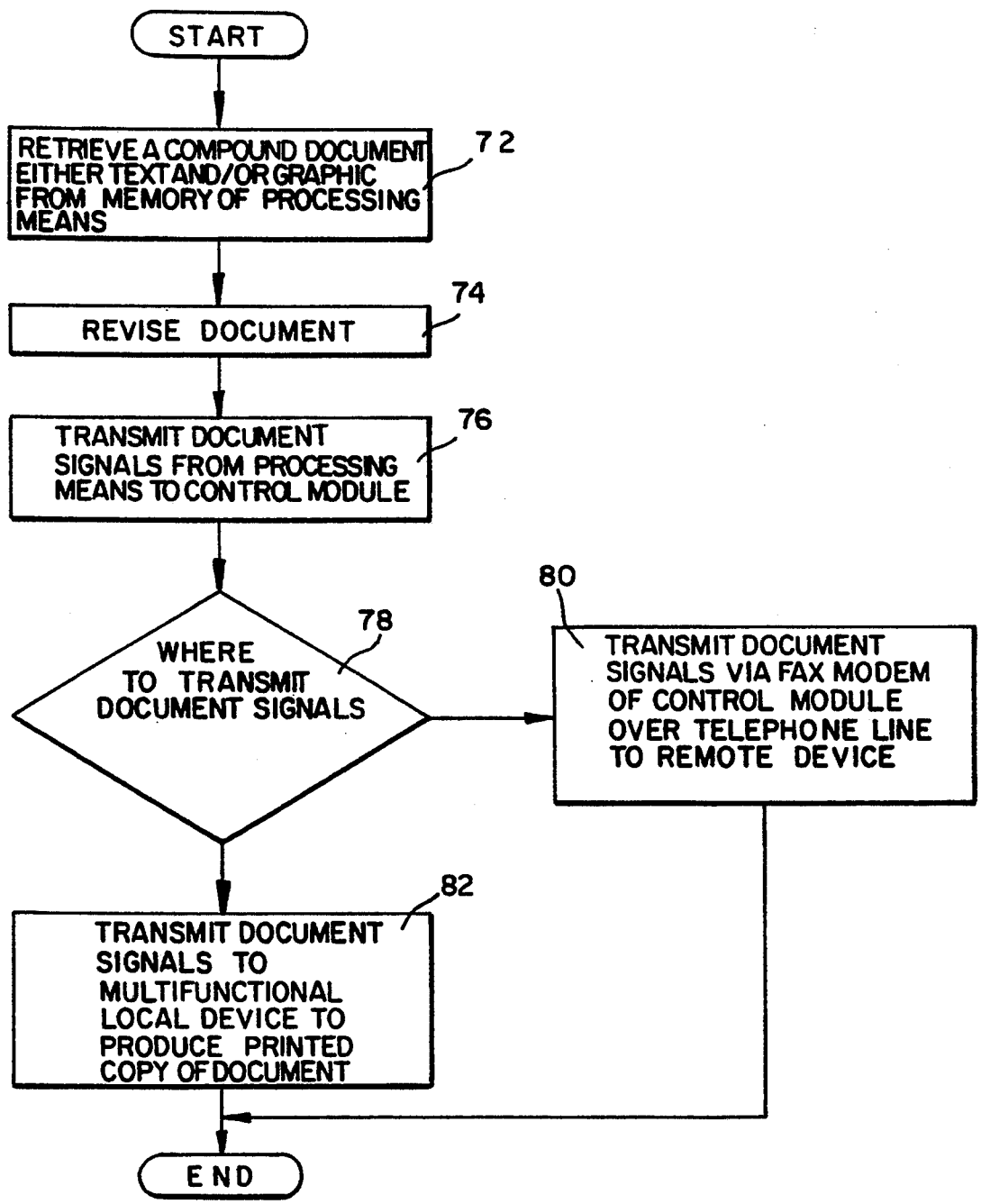
FIG. 8 is a flow chart depicting the editing and printing functions of the document processing system of FIG. 1.

Referring specifically to FIG. 8, there is shown a flow diagram depicting the preferred method of performing the printing function of the MDPS 10. A document to be printed is either created in the processing means 12 by using the keyboard 20 or is retrieved from the memory of the processing means 12 as shown in block 72. If revisions are to be made to the document, the document is revised in the processing means 12 as shown in block 74. The document signals are then transmitted from the processing means 12 to the control module 22 in block 76. The control module 22 determines what function is to performed with the document signals as shown in block 78. If the selected function is to fax the document to the remote device 16, the document signals are transferred to the facsimile modem located in the control module 22 which transmits the document signals over the communication medium 24 to the remote device 16 as shown in block 80. If the document is to printed the document signals are transferred from the control module 22 to the multifunctional local device 14 to produce a printed copy of the document as illustrated in block 82.

From the foregoing description, it can be seen that the present invention is directed to an integrated multifunctional document processing system 10 which is capable of scanning, faxing, copying and printing a document and for transmitting and receiving document signals to and from a remote device. It will be recognized by those skilled in the art that changes may be made to the above-described embodiment of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. An integrated multifunctional document processing system for faxing, copying, printing or scanning document information and for transmitting and receiving document signals to and from a remote device, the multifunctional document processing system comprising:

a housing;

main processing means located within the housing for processing all electrical document signals;

a multifunctional local device physically separate from but electrically connected to said main processing means, said multifunctional device located within the housing, said multifunctional local device including scanning means for optically scanning document information and for converting the scanned document information into electrical document signals, transmitting means for transmitting document signals to the main processing means, receiving means for receiving document signals from the main processing means, and recording means for producing a recorded form of document information based on received document signals;

a control means located within the housing, interfaced between the main processing means and the multifunctional local device, and having supplemental processing means for processing electrical document signals, the control means, under the control of the supplemental processing means, for receiving all incoming document signals from the multifunctional local device and from the remote device over a communication medium and for sending the received incoming document signal to the main processing means, the main processing means for processing the incoming document signals received from the control means and for processing and transmitting outgoing document signals, the control means also for receiving all outgoing processed document signals from the main processing means and sending received outgoing processed document signals to the multifunctional local device or the remote device over the communication medium, the control means functioning to require that all document signals from the local and remote devices be transmitted to the main processing means and that all processed document signals from the main processing means be transmitted to the local or remote devices, the control means further functioning, under the control of the supplemental processing means, to generate and transmit control signals to the multifunctional local device;

storing means for storing document signals received from said local device or said remote device in a memory within said main processing means;

determining means within the supplemental processing means for determining a destination for the stored document signals based on the received document signals; and retrieving means for retrieving stored document signals from the memory and transmitting the retrieved document signals to a destination established by the determining means.

2. The system according to claim 1, wherein the recording means is a printer integrated within the multifunctional local device which produces printed documents.

3. The system according to claim 2, wherein the printer is an LED page printer.

4. The system according to claim 1, wherein the control means further includes memory means for storing document signals received from the multifunctional local device or the remote device and for storing document signals transmitted from the processing means.

5. The system according to claim 1, wherein the processing means can selectively substantively edit document signals received from the remote device or the multifunctional local device and transmit the edited document signals to the multifunctional local device or the remote device.

6. The system according to claim 1, wherein the control means supplements processing functions performed by the processing means.

7. The system according to claim 1, wherein the processing means further includes memory means for storing document signals received from the multifunctional local device and the remote device.

8. A method of utilizing a multifunctional document processing system for transmitting a facsimile of a document to a remote location, the multifunctional document processing system including scanning means for optically scanning document information and main processing means for processing all document information, the scanning means and main processing means located within a housing, the method comprising the steps of:

placing a document to be faxed on the scanning means of the multifunctional document processing system;

scanning the document;

converting the scanned document into electrical document signals;

transferring the document signals to the main processing means utilizing a control module having supplemental processing means for processing electrical document signals within the control module, the control module being located within the housing;

determining in the supplemental processing means a destination for the document signals;

transferring the document signals from the main processing means to the control module;

identifying the destination of the document signals to be a facsimile modem;

transferring the document signals to the facsimile modem destination associated with the control module;

transmitting the document signals from the facsimile modem to a device at the remote location over a communication medium; and printing a copy of the transmitted facsimile at the remote location.

9. A method of utilizing a multifunctional document processing system for receiving a facsimile of a document to a remote location, the multifunctional document processing system including printing means for producing a printed document and main processing means for processing all document signals, the printing means and main processing means located within a housing, the method comprising the steps of:

receiving document signals from a device at the remote lcoation over a communication medium at a control module having supplemental processing means for processing electrical document signals within the control module, the control module being located within the housing;

transferring the document signals from the control module to the main processing means;

determining in the supplemental processing means a destination for the document signals;

identifying the destination of the document signals to be the multifunctional document processing system;

retrieving the document signals from the main processing means and transferring the document signals to the control module;

transferring the document signals from the control module to the multifunctional document processing system destination; and producing a printed copy of the document at the multifunctional document processing system.

10. A method of utilizing a multifunctional document processing systems for making a copy of a document, the multifunctional document processing system including scanning means for optically scanning document information, main processing means for processing all document information, and printing means for producing a printed document, the scanning means, processing means, and printing means located within a housing, the method comprising the steps of:

placing a document on the scanning means of the multifunctional document processing system;

scanning the document;

converting the scanned document into electrical document signals;

transferring the document signals to the main processing means utilizing a control module having supplemental processing means for processing electrical document signals within the control module, the control module being located within the housing;

determining in the supplemental processing means a destination for the document signals;

transferring the document signals from the main processing means to the control module;

identifying the destination of the document signals to be the printing means;

transferring the document signals from the control module to the printing means of the multifunctional document processing system; and producing a printed copy of the document.

* * * * *